(12) United States Patent
Qian et al.

(10) Patent No.: US 10,305,530 B2
(45) Date of Patent: May 28, 2019

(54) CASE HAVING HOLDER FOR TABLET/MOBILE PHONE

(71) Applicants: Davy Zide Qian, Arcadia, CA (US); Benyu Qian, Shanghai (CN); Lequn Lu, Shanghai (CN)

(72) Inventors: Davy Zide Qian, Arcadia, CA (US); Benyu Qian, Shanghai (CN); Lequn Lu, Shanghai (CN)

( * ) Notice: Subject to any disclaimer, the term of this patent is extended or adjusted under 35 U.S.C. 154(b) by 0 days.

(21) Appl. No.: 15/881,767

(22) Filed: Jan. 27, 2018

(65) Prior Publication Data

US 2018/0219571 A1 Aug. 2, 2018

Related U.S. Application Data

(60) Provisional application No. 62/451,717, filed on Jan. 28, 2017.

(51) Int. Cl.
*H04B 1/3888* (2015.01)
*A45C 11/00* (2006.01)

(52) U.S. Cl.
CPC ............ *H04B 1/3888* (2013.01); *A45C 11/00* (2013.01); *A45C 2011/002* (2013.01); *A45C 2011/003* (2013.01); *A45C 2200/15* (2013.01)

(58) Field of Classification Search
CPC . H04B 1/3888; A45C 11/00; A45C 2011/002; A45C 2011/003
USPC ...................................................... 455/575.8
See application file for complete search history.

(56) References Cited

U.S. PATENT DOCUMENTS

| | | | |
|---|---|---|---|
| 9,503,146 B1 * | 11/2016 | Chen .................... | H04B 1/3888 |
| 2017/0054467 A1 * | 2/2017 | Miyazawa ........... | H04B 1/3888 |
| 2018/0234530 A1 * | 8/2018 | Lee ......................... | H04M 1/02 |

* cited by examiner

*Primary Examiner* — Ayodeji O Ayotunde
(74) *Attorney, Agent, or Firm* — Global IP Service; Tianhua Gu

(57) ABSTRACT

A case having gripping holes and corrugated bottom for tablet/mobile phone comprises a tablet box for placing a tablet/mobile phone thereon and a releasable holding means for the tablet/mobile phone, the releasable holding means is fixed on the tablet box. The tablet box has a corrugated bottom comprising a plurality of curved bands, the curved band has an arc cross section and two paralleled sides, the two sides are perpendicular to long sides of the tablet box. A plurality of gripping holes are arranged on the corrugated bottom, the gripping holes are rectangular hole, and the wide of the rectangular hole is smaller than half wide of the curved band.

7 Claims, 8 Drawing Sheets

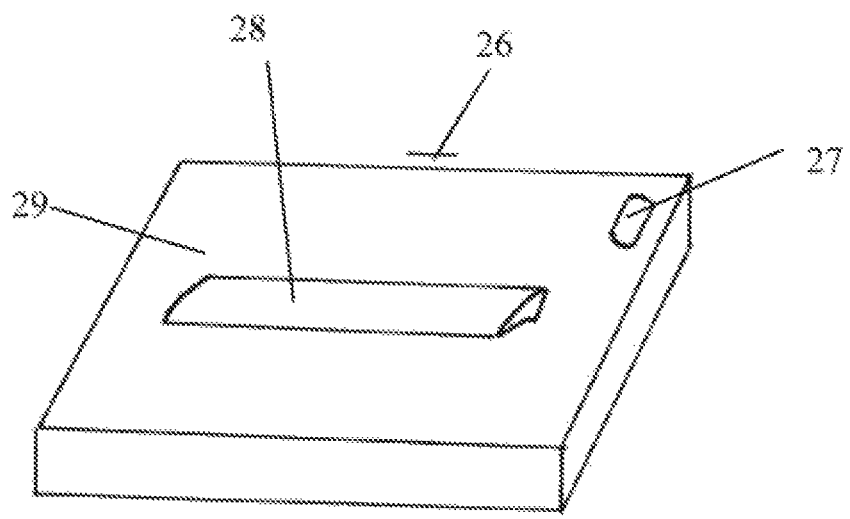
FIG. 9
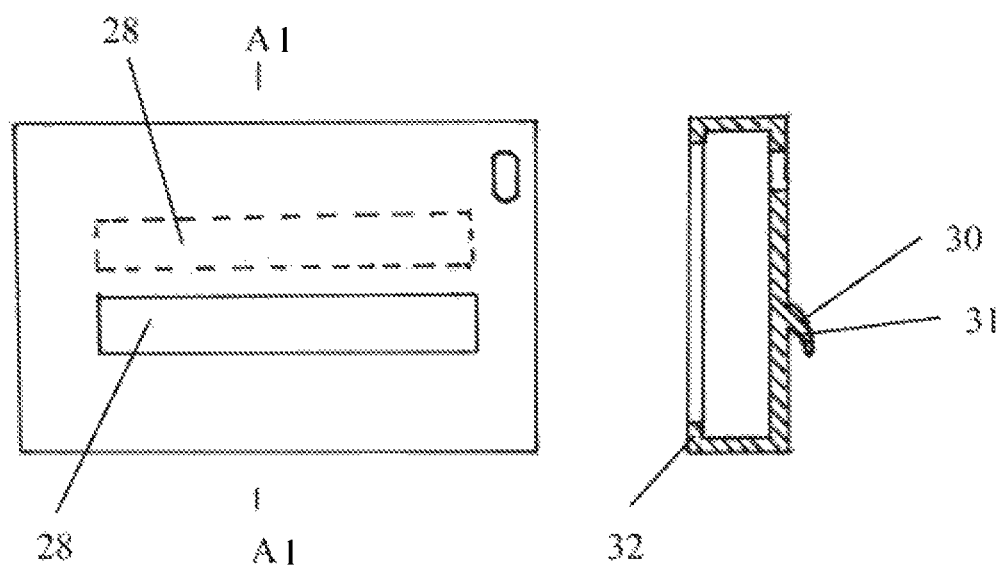
FIG. 10
FIG. 11

CASE HAVING HOLDER FOR TABLET/MOBILE PHONE

CROSS REFERENCE TO RELATED PATENT APPLICATION

The present application claims the priority of U.S. 62/451,717 filed on Jan. 28, 2017, which application is incorporated herein by reference.

FIELD OF THE INVENTION

A case having holder for tablet/mobile phone, which belongs to the accessories of tablets and mobile phones.

BACKGROUND OF THE INVENTION

Now, the scale of tablets and mobile phones grew and grew. While the big screen is easier to read, but the habit of using the hand holding the mobile phone or tablet and using thumb to operate the touch-screen becomes increasingly difficult, sometimes even causes mobile phone or tablet falling to the ground to be damaged. Various existing mobile phone or tablet cases, they just have functions of protection or supporting the phone or tablet on the table, but cannot solve the above mentioned difficulty.

The purpose of the present invention is to provide a case having holder for tablet/mobile phone for solving the above mentioned difficulties, i.e. the new case having holder for tablet/mobile phone can help people using his fingers and palm to hold phone or tablet easily and using the other hand for operating the touch-screen safely. Also the new case has a corrugated bottom which can reduce concussion when the tablet or mobile phone falling down on the ground to get a protection.

SUMMARY OF THE INVENTION

The purpose of present invention is realized by the following conceptions:

A case having gripping holes and corrugated bottom for tablet/mobile phone comprises a tablet box for placing a tablet/mobile phone therein and a releasable holding means for the tablet/mobile phone, the releasable holding means is fixed on the tablet box. The tablet box has a corrugated bottom comprising a plurality of curved bands, the curved band has an arc cross section and two paralleled sides, the two sides are perpendicular to long sides of the tablet box. A plurality of gripping holes are arranged on the corrugated bottom, the gripping holes are rectangular hole, and the wide of the rectangular hole is smaller than half wide of the curved band.

The corrugated bottom has five curved bands, they are first, second, third, fourth and fifth cured bands counted from the curved band with camera hole.

The corrugated bottom has two gripping holes arranged on second and fourth curved bands, each gripping hole is near the third curved band.

The corrugated bottom has two gripping holes, one gripping hole is arranged on second cured band and is near the middle curved band, and another gripping hole is arranged across third, fourth and fifth cured bands and is parallel to and near one of the long sides of the tablet box.

The corrugated bottom has four gripping holes, two gripping holes are arranged on the first and fifth brands respectively, another two gripping hole are arranged across second, third and fourth cured bands and are parallel to and near the long sides of the tablet box respectively.

The corrugated bottom has four gripping holes, two gripping holes are arranged on the first and fifth brands respectively, another two gripping hole are arranged across second, third and fourth cured bands and are declining to the long sides of the tablet box respectively.

A case having bulgy holder for tablet/mobile phone comprises a tablet box for placing a tablet/mobile phone therein; a releasable holding means for the tablet/mobile phone, the releasable holding means is fixed on the tablet box; the tablet box has a flat bottom;

a plurality of bulgy holders arranged on the flat bottom, the bulgy holder has a concave curved surface for finger holding and a bulgy curved surface.

User uses fingers inserting in the gripping holes or holding the bulgy holders to coordinate with the rest fingers to form a secure grip of the case and tablet/mobile phone combination, while the fingers of other hand can operate the tablet/mobile phone. Also the new case has a corrugated bottom which can reduce concussion when the tablet or mobile phone falling down on the ground, thereby a protection is provided to the tablet or mobile phone.

BRIEF DESCRIPTION OF THE DRAWINGS

FIG. 9 is a perspective view of one embodiment of the case having a bulgy holder for tablet/mobile phone of the present invention.

FIG. 10 is a front elevational view of the case shown in the FIG. 9.

FIG. 11 is an A1-A1 cross section view of the case shown in the FIG. 10.

DETAIL DESCRIPTION OF THE INVENTION

Figure 1:
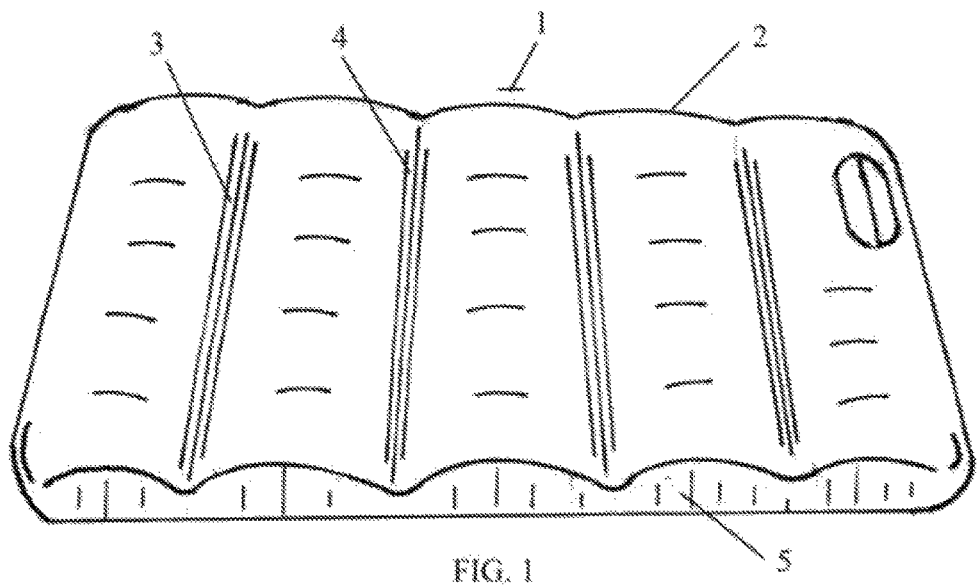
FIG. 1 is a perspective view of a case having a corrugated bottom for tablet/mobile phone of the present invention.
Figure 3:
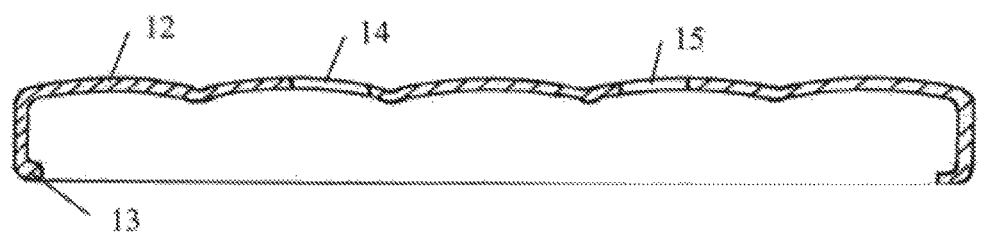
FIG. 3 is an A-A cross section view of the case shown by the FIG. 2.

As shown in the FIGS. 1 and 3 the tablet case (1) has a corrugated bottom (2) which is composed by a plurality of curved bands, the curved band has an arc cross section (12)

and two paralleled sides (3, 4), the two sides (3, 4) are perpendicular to long sides (5) of the tablet box (1). A releasable holding means (13) for holding the tablet/mobile phone is fixed on the sides of the tablet box (1).

Figure 2:
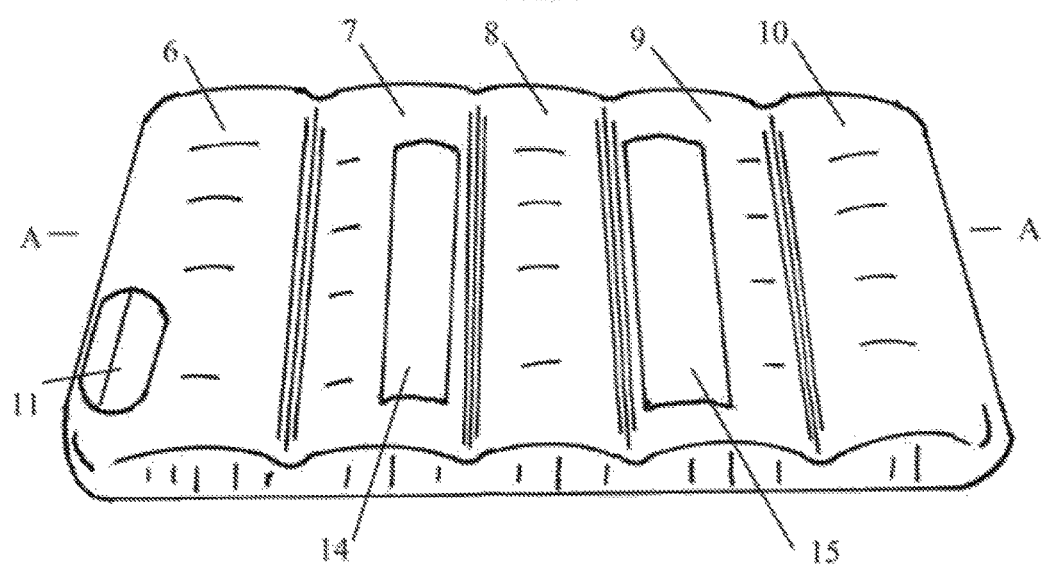
FIG. 2 is a perspective view of one embodiment of the case having gripping holes and corrugated bottom for tablet/mobile phone of the present invention.

As shown in the FIG. 2, the corrugated bottom has five curved bands, they are the first, second, third, fourth and fifth cured bands (6, 7, 8, 9, 10) counted from the curved band with a lens hole (11).

The corrugated bottom (2) has two gripping holes (14, 15) arranged on the second and fourth curved bands (7, 9), each gripping hole is near the third curved band (8) (see FIG. 3). The wide of each rectangular hole (14 or 15) is smaller than half wide of the curved band (7 or 9).

Figure 4:
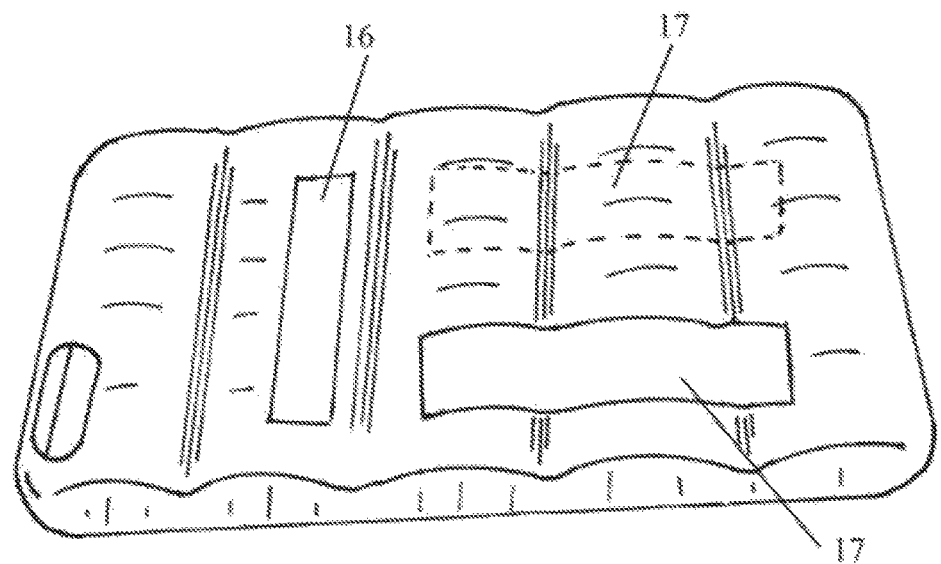
FIGS. 4 to 6 are perspective view of other embodiments of the case having gripping holes and corrugated bottom for tablet/mobile phone of the present invention.

As shown in the FIG. 4, the corrugated bottom (2) has two gripping holes (16, 17), one gripping hole (16) is arranged on second cured band (7) and is near the middle curved band (8), another gripping hole (17) is arranged across third, fourth and fifth cured bands (8, 9, 10) and is parallel to and near one of the long sides (5) of the tablet box (1). The gripping hole (17) may be arranged on the up-side of the corrugated bottom (2) as the gripping hole (17) shown by the dotted line.

Figure 5:
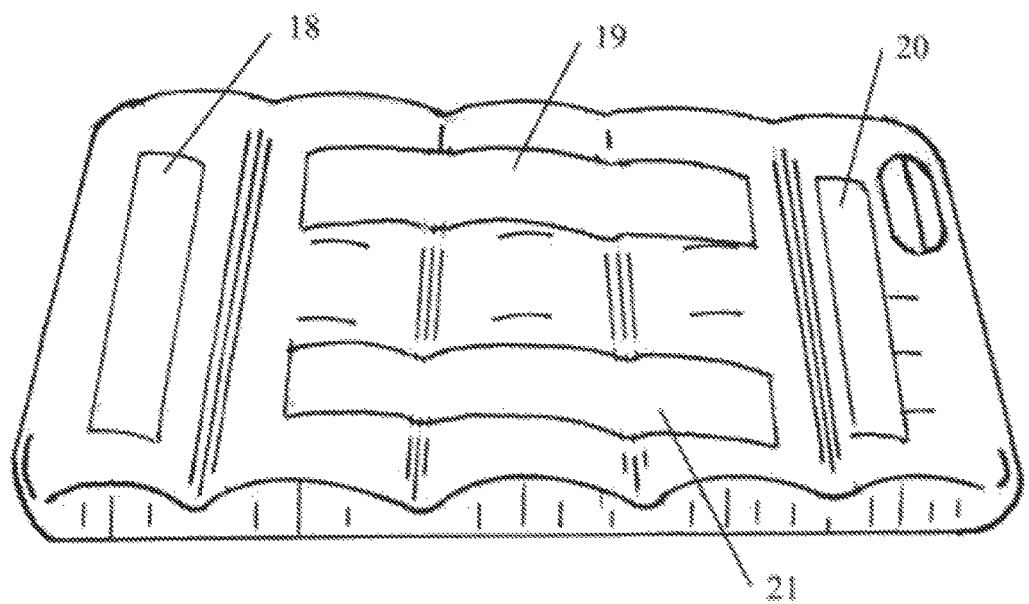

As shown in the FIG. 5, the corrugated bottom (2) has four gripping holes (18, 19, 20, 21), two gripping holes (18, 20) are arranged on the first and fifth brands (6, 10) respectively, another two gripping hole (19, 21) are arranged across the second, third and fourth cured bands (7, 8, 9) and are parallel to and near the long sides (5) of the tablet box 1 respectively.

Figure 6:
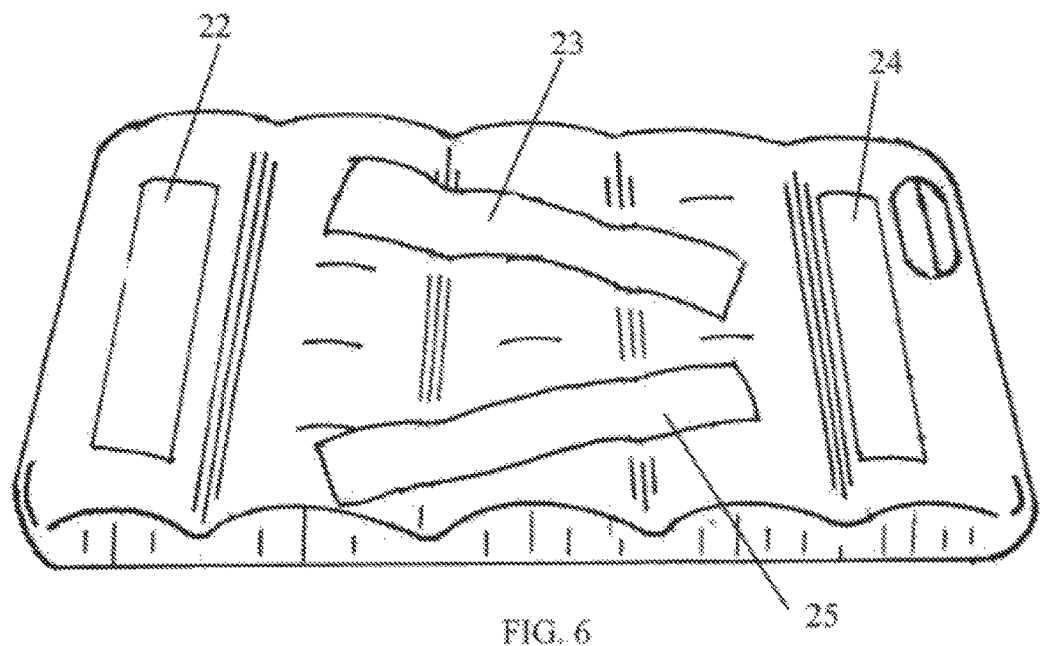

As shown in the FIG. 6, the corrugated bottom (2) has four gripping holes (22, 23, 24, 25), two gripping holes (22, 24) are arranged on the first and fifth brands (6, 10) respectively, another two gripping hole (23, 25) are arranged across the second, third and fourth cured bands (7, 8, 9) and are declining to the long sides (5) of the tablet box (1) respectively.

Figure 7:
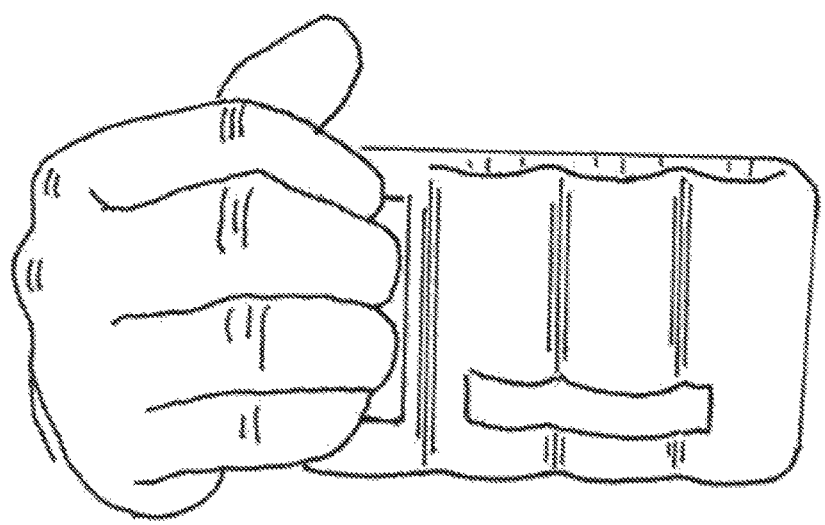
FIGS. 7 and 8 show the usage of the case having gripping holes and corrugated bottom for tablet/mobile phone of the present invention.
Figure 8:
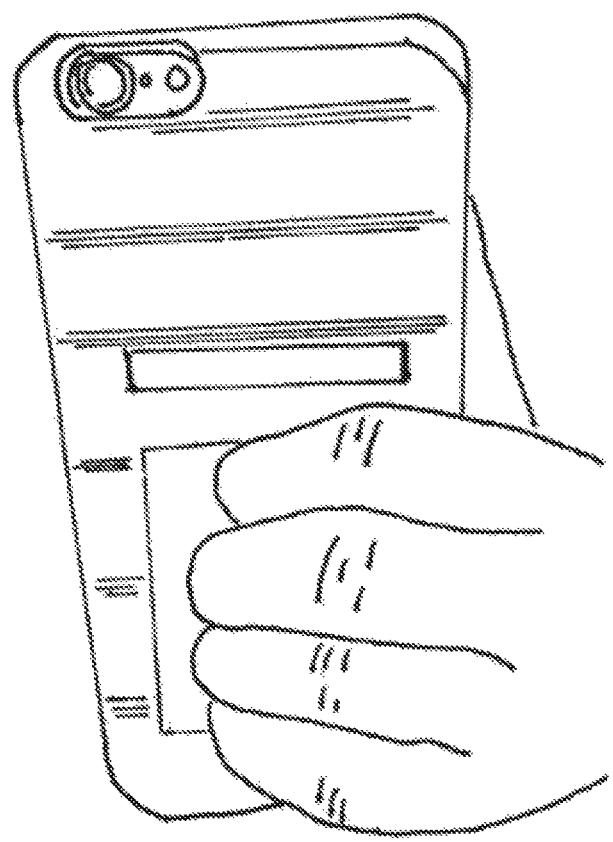

As shown in FIGS. 7 and 8, people can easy hold the case with tablet/mobile phone by using the gripping holes.

As shown in FIGS. 9, 10 and 11, a case having bulgy holder for tablet/mobile phone comprises a tablet box (26) for placing a tablet/mobile phone therein, a releasable holding means (32) for the tablet/mobile phone, the releasable holding means (32) is fixed on the tablet box (26). The tablet box (26) has a flat bottom (29).

A bulgy holder (28) is arranged on the flat bottom (29). The bulgy holder (28) is parallel to the long sides of the tablet box. In one embodiment the bulgy holder (28) is near the bottom long side, in another embodiment the bulgy holder (28) is near the top long side of the tablet box (shown by broken line near the lens hole (27)). The bulgy holder (28) has a concave curved surface (31) for finger holding and a bulgy curved surface (30).

Figure 12:
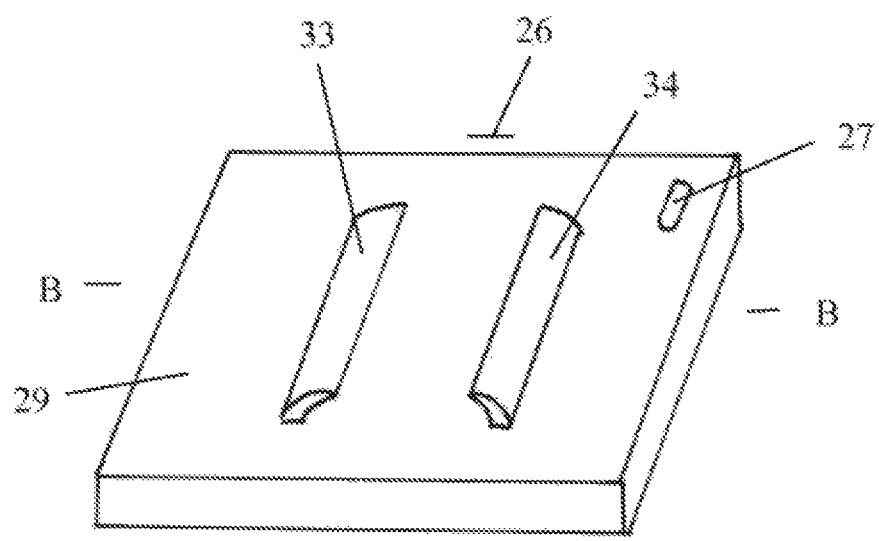
FIG. 12 is a perspective view of another embodiment of the case having a bulgy holder for tablet/mobile phone of the present invention.
Figure 13:
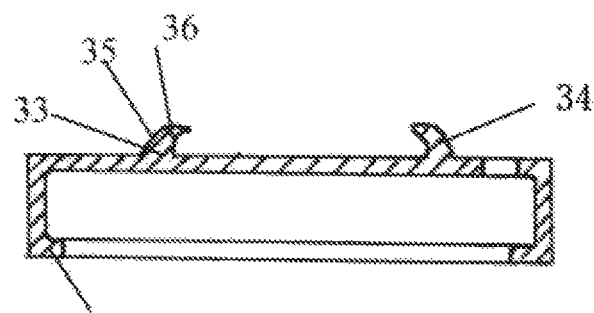
FIG. 13 is a B-B cross section view of the case shown in the FIG. 12.

As shown in FIGS. 12 and 13, two bulgy holders (33) and (34) are arranged on the flat bottom (29) and parallel to the shot sides of the tablet box (26). The left bulgy holder (33) has a concave curved surface (36) for finger holding and a bulgy curved surface (35). The right bulgy holder (34) has same concave curved surface for finger holding and same bulgy curved surface as the left bulgy holder (33).

Figure 14:
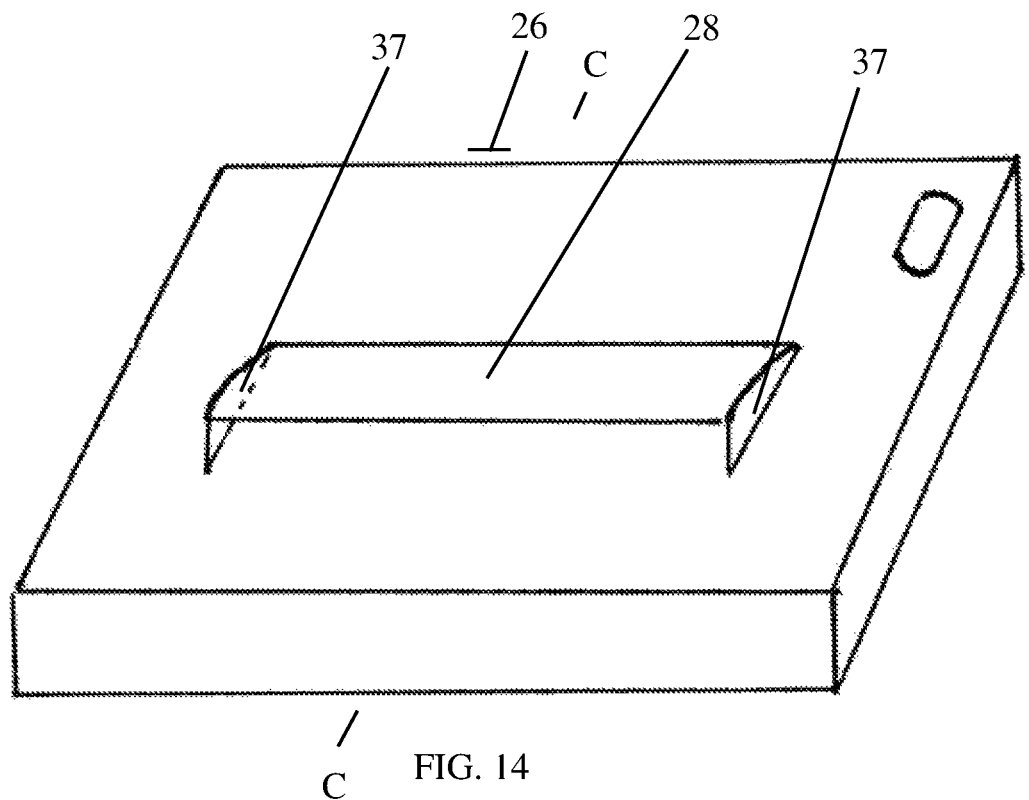
FIG. 14 is a perspective view of another embodiment of the case having a bulgy holder for tablet/mobile phone of the present invention.
Figure 15:
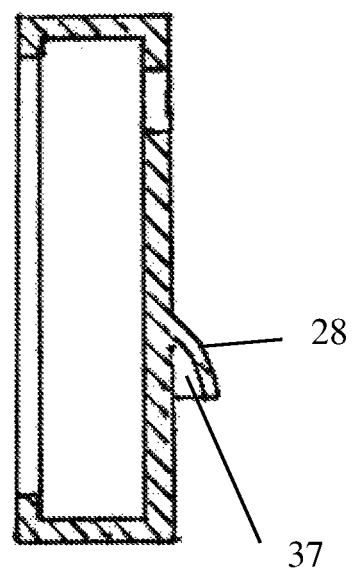
FIG. 15 is a C-C cross section view of the case shown in the FIG. 14.

As shown in FIGS. 14 and 15, two ends of the bulgy holder 28 have end walls (37).

Figure 16:
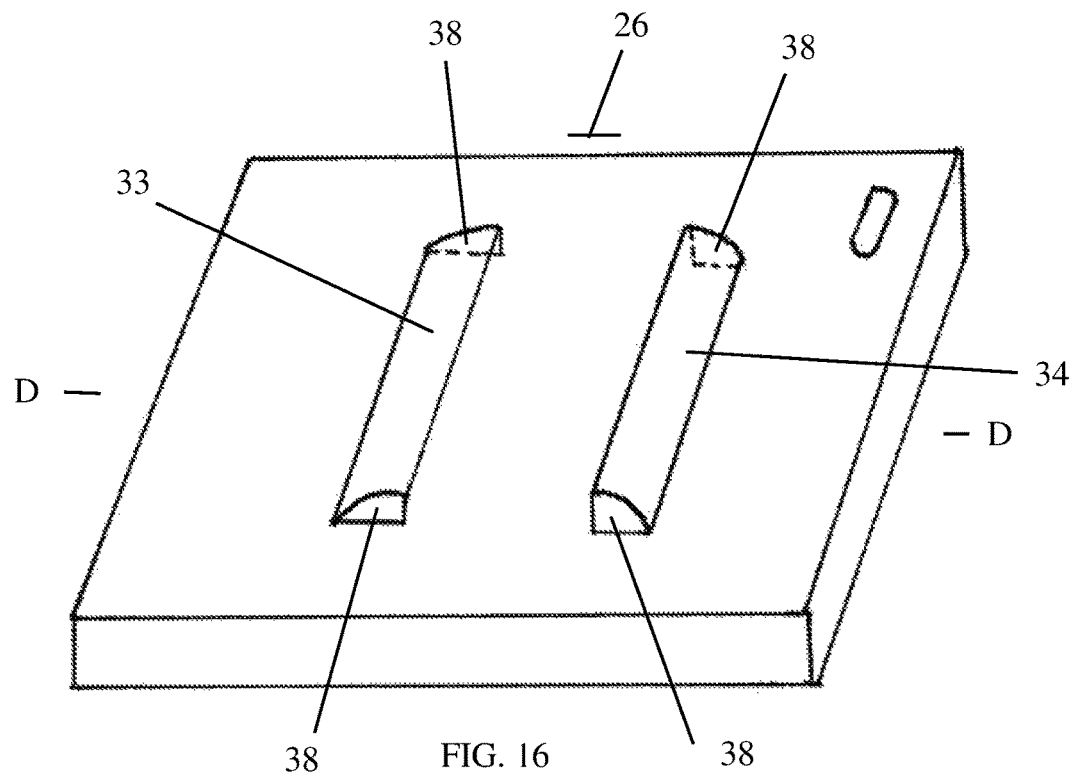
FIG. 16 is a perspective view of another embodiment of the case having a bulgy holder for tablet/mobile phone of the present invention.
Figure 17:
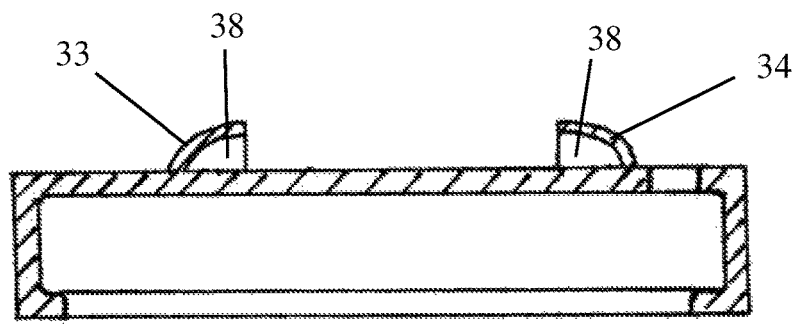
FIG. 17 is a D-D cross section view of the case shown in the FIG. 16.

As shown in FIGS. 16 and 17, two ends of each bulgy holder (33 or 34) have end walls (38).

What is claimed is:

1. A case having gripping holes and corrugated bottom for tablet/mobile phone comprising:
    a tablet box for placing a tablet/mobile phone therein;
    a releasable holding means for the tablet/mobile phone, the releasable holding means is fixed on the tablet box;
    the tablet box has a corrugated bottom comprising a plurality of curved bands, the curved band has an arc cross section and two paralleled sides, the two sides are perpendicular to long sides of the tablet box;
    a plurality of gripping holes arranged on the corrugated bottom, the gripping holes are rectangular hole, a wide of the rectangular hole is smaller than half wide of the curved band.

2. The case having gripping holes and corrugated bottom for tablet/mobile phone of claim 1, wherein the corrugated bottom has five curved bands, they are first, second, third, fourth and fifth cured bands counted from the curved band with camera hole.

3. The case having gripping holes and corrugated bottom for tablet/mobile phone of claim 2, wherein the corrugated bottom has two gripping holes arranged on second and fourth curved bands, each gripping hole is near the third curved band.

4. The case having gripping holes and corrugated bottom for tablet/mobile phone of claim 2, wherein the corrugated bottom has two gripping holes, one gripping hole is arranged on second cured band and is near the middle curved band, another gripping hole is arranged across third, fourth and fifth cured bands and is parallel to and near one of the long sides of the tablet box.

5. The case having gripping holes and corrugated bottom for tablet/mobile phone of claim 2, wherein the corrugated bottom has four gripping holes, two gripping holes are arranged on the first and fifth brands respectively, another two gripping hole are arranged across second, third and fourth cured bands and are parallel to and near the long sides of the tablet box respectively.

6. The case having gripping holes and corrugated bottom for tablet/mobile phone of claim 2, wherein the corrugated bottom has four gripping holes, two gripping holes are arranged on the first and fifth brands respectively, another two gripping hole are arranged across second, third and fourth cured bands and are declining to the long sides of the tablet box respectively.

7. The case having gripping holes and corrugated bottom for tablet/mobile phone of claim 1, wherein the case is made by elastic materials.

* * * * *